United States Patent

[11] 3,611,294

| [72] | Inventors | Jerry D. O'Neill<br>Lake Hopatcong;<br>George L. Howitt, River Edge, both of N.J. |
|---|---|---|
| [21] | Appl. No. | 806,026 |
| [22] | Filed | Mar. 5, 1969 |
| [45] | Patented | Oct. 5, 1971 |
| [73] | Assignee | Display Sciences, Inc.<br>Upper Saddle River, N.J.<br>Continuation-in-part of application Ser. No. 623,007, Mar. 14, 1967, now abandoned. |

[54] PORTABLE STOCK TICKER
6 Claims, 4 Drawing Figs.

[52] U.S. Cl. .................................................. 340/152, 340/154
[51] Int. Cl. .................................................. H04q 7/02
[50] Field of Search ........................................... 325/32; 178/22; 340/152, 154

[56] References Cited
UNITED STATES PATENTS

| 2,740,106 | 3/1956 | Phelps | 340/154 |
| 2,946,986 | 7/1960 | Harrison | 340/152 |
| 3,248,700 | 4/1966 | Sinn | 340/152 |
| 3,387,268 | 6/1968 | Epstein | 340/154 |

*Primary Examiner*—Rodney D. Bennett, Jr.
*Assistant Examiner*—Brian C. Ribando
*Attorney*—Watson, Leavenworth & Kelton

ABSTRACT: A system of disseminating stock data and similar information transmitted and coded in form to be received by subscribers by setting a proper code on a receiving unit including decoding means.

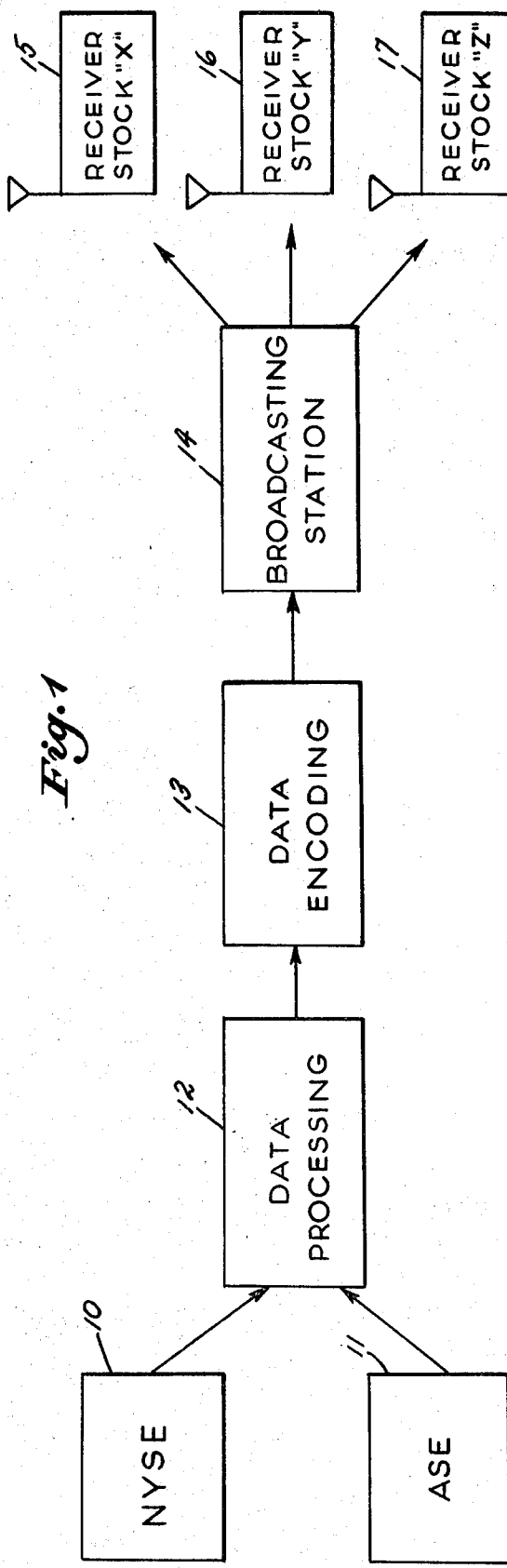

PORTABLE STOCK TICKER

This application is a Continuation-In-Part of our copending application Ser. No. 623,007 filed Mar. 14, 1967 now abandoned under the same title.

This invention relates generally to the field of communications, and more particularly to an improved form of data dissemination from a central source to a plurality of locations, each location utilizing only those messages which correspond to a preestablished identity. Although not limited to the field of transmission of security data, the invention has particular application to the transmission of up to the minute information relating to any preidentified security.

The field of stock data transmission is not entirely new, but in the case of prior art devices, it is necessary to provide a request for information to a source of the information, following which the requested information is transmitted to be received by the interested party. Although the request for information, and the subsequent transmission of such information can be accomplished at relatively high speed, the equipment required is unduly complex, and correspondingly expensive.

By contrast, in the present invention, it is contemplated to provide means for continuously transmitting in encoded form selected pertinent items, such as the current sales price, the high and low prices for the day or week, or other items which may vary with greater frequency, as contrasted with those items of information which are of a relatively fixed nature, such as the high price and low price for the year. The invention contemplates the broadcasting and/or transmission of this information in sequential form, which may be, for example, in the alphabetic order of the symbol assigned to a given security. Each message so transmitted will include an identifying portion, followed by one or more messages, each message transmitting a specific item of information. Depending upon the band width of the carrier employed, data relating to each security can be sampled several times a minute, so that requested information is continuously maintained at a current state.

Receiving the modulated carrier are a plurality of broadcast receivers each of which is provided with a decoding attachment, or a completely self-contained receiver-decoder may be employed. A demodulated signal is applied to the decoder which functions upon receipt of a predetermined identity message, and transfers its subsequently received information to a suitable readout display.

It is among the principal objects of the present invention to provide an improved information transmission system in which specific information may be obtained from a continuously transmitting source, without the necessity of placing a request message with the transmitting source.

Another object of the invention lies in the provision of an improved security data information transmission system which may be of materially simplified construction, as contrasted with prior art devices of a similar nature.

Yet another object of the invention lies in the provision of an improved information transmitting system, in which the cost of fabrication may be of a reasonably low order, with consequent wide sale, distribution and use.

A feature of the disclosed embodiment lies in the fact that it may be conveniently used on a subscription basis, in which the subscribers are provided with punched cards in return for payment of a subscription fee, whereby the system may be operated on a self-sustaining financial basis.

Another feature of the system lies in the fact that it may be used in conjunction with a wide variety of radiant energy transmission systems or various wire or cable transmission systems such as Community Antenna Television Systems, telephone type lines, etc.

These objects and features, as well as other incidental ends and advantages, will more fully appear in the progress of the following disclosure, and be pointed out in the appended claims.

In the drawing, to which reference will be made in the specification:

FIG. 1 is a block diagram of a data transmission system embodying the invention.

FIG. 2 is a schematic diagram illustrating a sample complete message frame containing a message code or identity portion, followed by a plurality of discrete messages identified with a single indicia.

Figure 3:
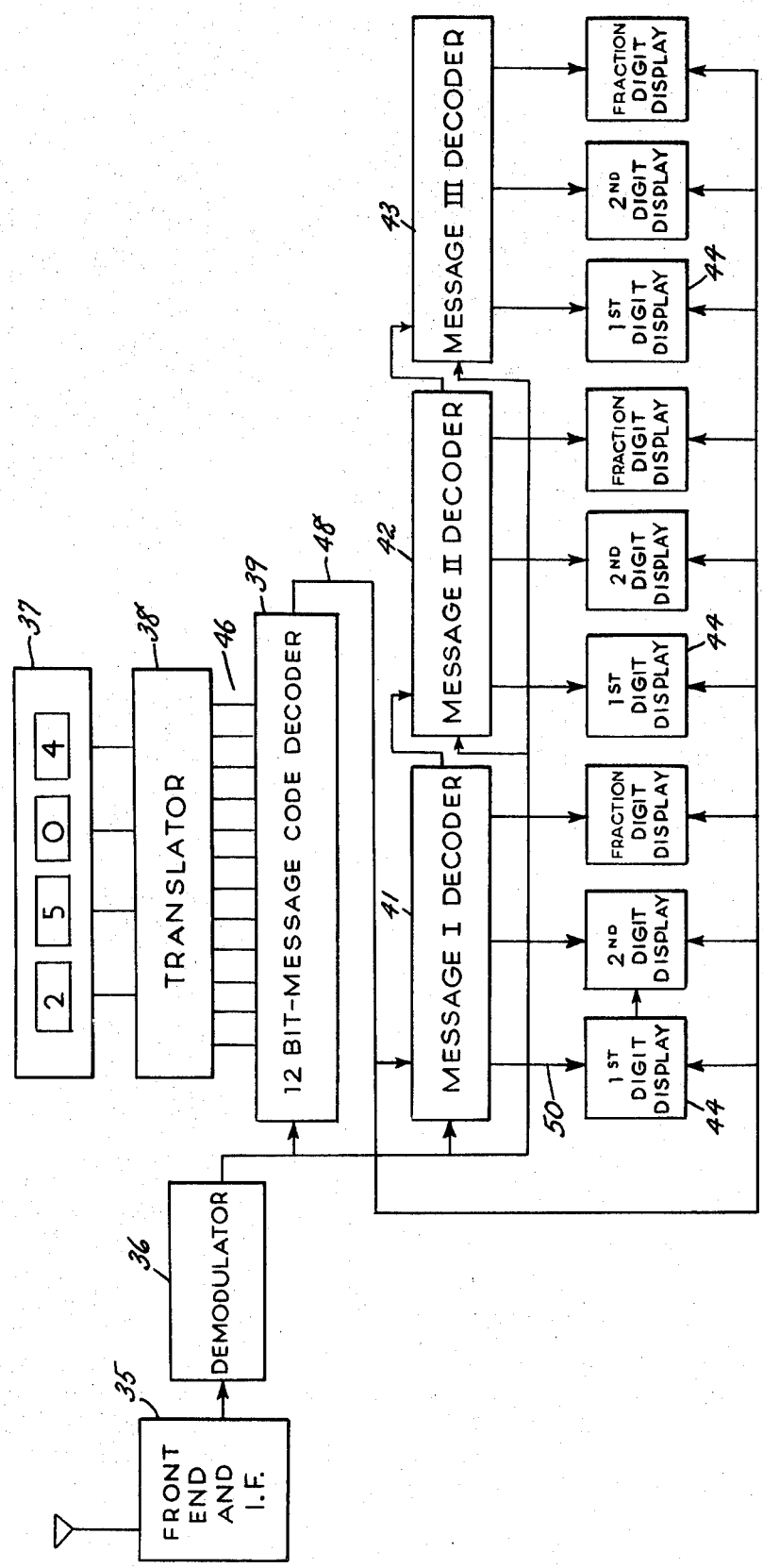
FIG. 3 is a schematic diagram showing a receiver-decoder forming a part of the disclosed system.

In accordance with the invention, the transmission system embodying the invention comprises broadly a plurality of information sources 10, 11, a data-processing station 12, a data encoding means 13, a broadcast station 14, and a plurality of radio receivers 15, 16, and 17 (FIG. 1).

The information sources 10 and 11 may be any of a number of security exchanges, over-the-counter security dealers, or any other source of prime information relating to securities. These organizations customarily supply up to date information to existing data-processing services, who customarily supply this information to brokers to be available to their customers.

Data encoding involves the conversion of available data into binary or other suitable pulse coding in suitable form for transmission by a modulated carrier wave.

A typical coded message format is shown in FIG. 2 in the drawing. It consists of a series of 1's and 0's. A complete message frame, as indicated by reference character 20 is separated at each end from similar message frames by framing pulses 21. The initial portion of the message is a message code or indicia group 22 which serves as a label to tag the subsequently following message information. In the case of security quotation information, it will identify a given security. Twelve pulse positions for the message code will permit 4,096 discrete messages to be transmitted and identified, this figure being determined by raising 2 to the 12th power. This figure is presently more than adequate for the number of listed and unlisted securities in which there is an established market.

The 12 individual pulse positions, generally indicated by reference character 23, are separated by a framing pulse 24 from a first message portion 25 including first, second and third parts 26, 27 and 28, respectively. The first message 25, could, for example, contain information relative to the sales price of the last sale consumated, and by using a 3-bit digit readout, the last 2 digits plus the usual one-eighth fraction can be displayed. Since fluctuations in an individual security during the sampling period referred to hereinabove, will rarely if ever exceed 100 points, the 3-digit readout will normally be capable of transmitting sufficient information.

The first message 25 is separated by a framing pulse 29 from a second message 30 having a similar number of pulses when compared to the first message 25, and the second message will also be divided to include first, second and third parts (not shown). Another framing pulse 31 separates the second message 30 from a third message 32 of similar format. The second and third messages may be employed, for example, to display the high- and low-selling price for the day, or in the case of an over-the-counter security, the bid and asked quotations.

Each subscriber will be provided with a receiver 15 including the components graphically shown in FIG. 3 in the drawing. A front end and intermediate frequency section 35 of conventional design feeds a demodulator 36 of similarly conventional design. The particular security about which information is desired is determined by adjusting a plurality of identification code wheels 37 to a predetermined indicia, the code wheels 37 cooperating with a translator 38 of card-insert type to establish a 1 and 0 code for the security of interest on output lines 46, which are connected to the 12-bit message decoder 39. Code wheel and translator apparatus of this type is described in U.S. Pat. No. 3,248,700, issued on Apr. 26, 1966 to R. S. Sinn. When a demodulated signal is applied to the decoder, the coded pulses are fed serially into a shift register in the message decoder 39. When the 1's and 0's stored in the shift register agree with the 1 and 0 code for the security of interest, as set in by the code wheels and translator, an output pulse is created. Correlation circuit elements of this type are described at page 8 of Dual RTµL Data Sheet, Fairchild Semiconductor, Sept. 1966.

The output pulse is employed to start the message information decoders, and to erase the previous displays. Separate decoders, i.e., to apply contents thereof through output terminals thereof onto lines 50, 41, 42 and 43 are used for the first message 25, the second message 30 and the third message 32, each decoder supplying information to digital displays 44, which will continue to present a message until erased.

Figure 4:
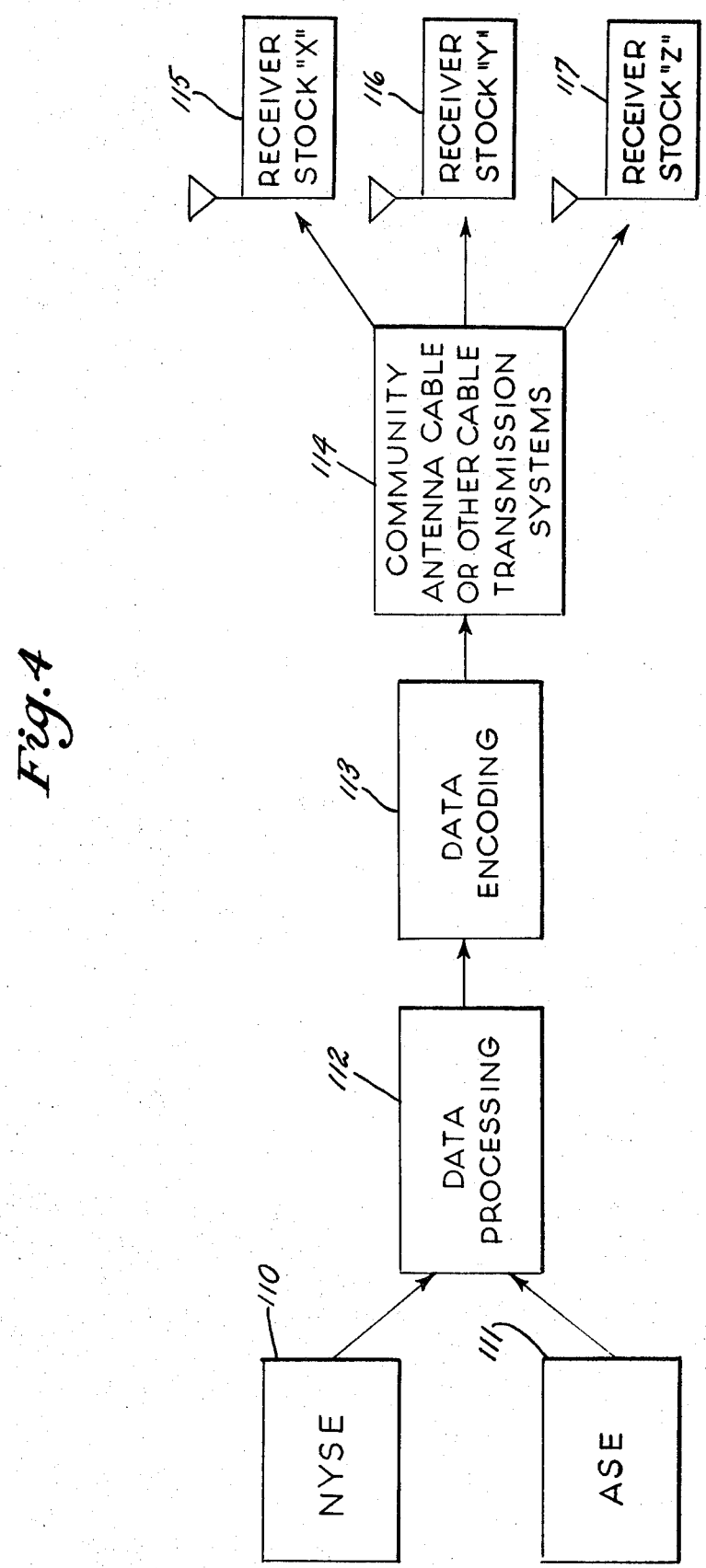
FIG. 4 is a block diagram of an alternate form of transmission system.

For transmission to the receiver, any suitable form of carrier may be utilized, such as AM, FM or PM (phase modulation). Narrow band frequency shift keying is probably the simplest means for both the broadcast station and the receivers. Where it is desired to repeat the information relative to each security once per second, approximately 200,000 pulses must be transmitted during this period, and the corresponding video band width would be 100,000 c.p.s. and the required RF band width (for frequency shift keying) would be 200,000 c.p.s. If the information to be transmitted is restricted to RF band width of 10,000 c.p.s. (as would be the case in AM broadcasting), then the data for each security could be repeated approximately every 20 seconds. Turning now to the alternate form of the embodiment illustrated in FIG. 4, parts corresponding to those of the principal form have been designated by similar reference characters with the additional prefix "1."

The alternate form differs from the principal form in the provision of a community antenna television system cable 114 to replace the broadcasting station 14 of the principal embodiment, in those areas where such systems are locally available. Certain advantages flow from such use, the principal one of which is the availability of roughly four times the band width available where the message broadcast.

To illustrate, if the 12 kHz. wide FM-SCA (subsidiary communications authorization) channel were to be used, the rate would be 200 stocks per second, if 48 bits of information per stock are considered (address — 12 bits, last sale — 12 bits, high — 12 bits, low — 12 bits).

By contrast, if the 50 kHz. wide FM-stereo channel were to be used, with roughly four times the band width available, the rate would likewise be increased by that factor, or to 800 stocks per second.

Where a community antenna television channel is considered, there is a minimum of 50 times more band width available or 50 times more data may be transmitted in the same 1 second. This additional band width may be utilized to speed up the data rate by a factor of 50, or, the processing of 6,000 stocks (at 48 bits per stock) in one-tenth of a second. Alternately, 96 bits of information per stock relative to 6,000 stocks could be processed in one-fifth of a second.

A clock frequency of 2.5 to 3.0 mHz. would be required to handle the 2.5 to 3.0 mHz. bit rate and operation at these frequencies, a requirement well within the present state of the art.

Since, there are presently some 2,900 stocks traded on the New York and American Stock Exchanges, the previously mentioned number of stocks could conservatively be accommodated in a normal community antenna television channel, with room for considerable expansion of stock listings.

We wish it to be understood that we do not consider the invention limited to the precise details of structure shown and set forth in this specification, for obvious modifications will occur to those skilled in the art to which the invention pertains.

We claim:

1. A receiver providing output signals indicative of any desired one of a plurality of security price data indicated in a succession of transmitted signals applied to said receiver, each said applied signal including a first pulse group identifying a particular security and at least a second pulse group indicative of price data pertaining to said identified security, comprising:
    a. operator-controlled means having capacity for generation of all said first pulse groups identifying each of said securities and controllable to generate any desired first pulse group;
    b. first shift register and decoder means receiving said applied signals and said pulse group generated by said operator-controlled means and providing an output signal exclusively on correlation between first pulse groups of said applied signals and said pulse group generated by said operator-controlled means; and
    c. second shift register and decoder means receiving said applied signals and having output terminals providing said receiver output signals, said second shift register and decoding means being operatively responsive to said first shift register and decoder means output signal to selectively conduct to said output terminals second pulse groups of said applied signals.

2. The receiver claimed in claim 1 further including security price data display means connected to said receiver output terminals.

3. The receiver claimed in claim 2 wherein said transmitted signals are modulated signals, said receiver further including means demodulating said transmitted signals for generation of said applied signals.

4. The receiver claimed in claim 3 further including front end and intermediate frequency circuit means for detection of signals transmitted by an FM-SCA channel.

5. The receiver claimed in claim 3 further including front end and intermediate frequency circuit means for detection of signals transmitted by an FM stereo channel.

6. The receiver claimed in claim 3 further including front end and intermediate frequency circuit means for detection of signals transmitted by a community antenna television system.